(12) United States Patent
Kato et al.

(10) Patent No.: US 12,512,246 B2
(45) Date of Patent: Dec. 30, 2025

(54) MAGNETIZING METHOD AND MAGNETIZING APPARATUS

(71) Applicant: HONDA MOTOR CO., LTD., Tokyo (JP)

(72) Inventors: Toshitaka Kato, Wako (JP); Shinji Nemoto, Wako (JP); Tokio Taira, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 394 days.

(21) Appl. No.: 18/123,400

(22) Filed: Mar. 20, 2023

(65) Prior Publication Data

US 2023/0307999 A1 Sep. 28, 2023

(30) Foreign Application Priority Data

Mar. 28, 2022 (JP) ................................ 2022-051558

(51) Int. Cl.
*H01F 13/00* (2006.01)
*H02K 1/276* (2022.01)
*H02K 15/03* (2006.01)

(52) U.S. Cl.
CPC ........... *H01F 13/003* (2013.01); *H02K 1/276* (2013.01); *H02K 15/03* (2013.01); *H02K 2215/00* (2021.08)

(58) Field of Classification Search
CPC .... H02K 15/03; H02K 1/276; H02K 2215/00; H01F 13/003
See application file for complete search history.

(56) References Cited

U.S. PATENT DOCUMENTS

| | | | |
|---|---|---|---|
| 8,258,906 B2* | 9/2012 | Sivasubramaniam | ...................... H02K 15/03 310/156.01 |
| 2003/0071533 A1 | 4/2003 | Kikuchi et al. | |
| 2011/0006865 A1* | 1/2011 | Hemmelmann | ...... H01F 13/003 335/284 |
| 2011/0221552 A1 | 9/2011 | Rochford et al. | |

FOREIGN PATENT DOCUMENTS

| | | | |
|---|---|---|---|
| JP | 2003-134773 | 5/2003 | |
| JP | 2005-210882 | 8/2005 | |
| JP | 2005-224055 | 8/2005 | |
| JP | 2013247782 A | * 12/2013 | |
| KR | 102555684 B1 | * 7/2023 | ........... H01F 13/003 |

OTHER PUBLICATIONS

Japanese Office Action for Japanese Patent Application No. 2022-051558 dated Sep. 19, 2023.

* cited by examiner

*Primary Examiner* — Mohamad A Musleh
(74) *Attorney, Agent, or Firm* — Amin, Turocy & Watson, LLP

(57) ABSTRACT

A magnetizing method applies, to a rotor including a plurality of magnetic bodies that are arranged in the circumferential direction of the rotor and are to be magnetized, a magnetic field in a radial direction of the rotor to magnetize the magnetic bodies. The magnetizing method includes a step of arranging a magnetizing coil near the outer peripheral portion of the plurality of magnetic bodies and a step of applying a radially outward magnetic field only to one of the magnetic bodies while applying radially inward magnetic fields to the plurality of magnetic bodies.

6 Claims, 4 Drawing Sheets

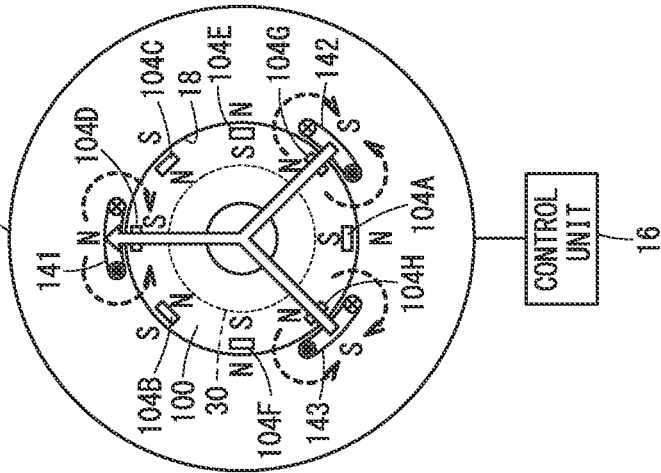
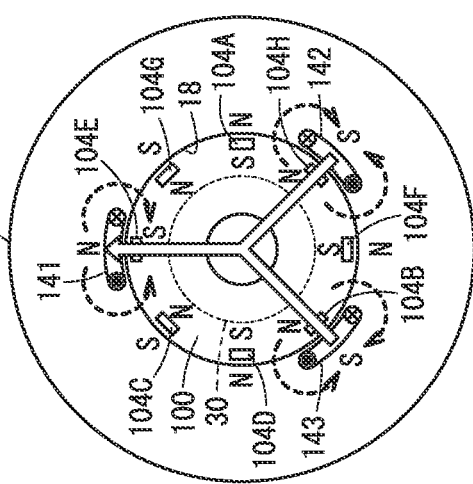
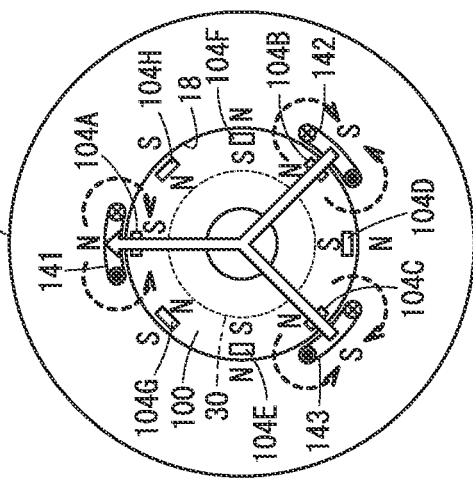

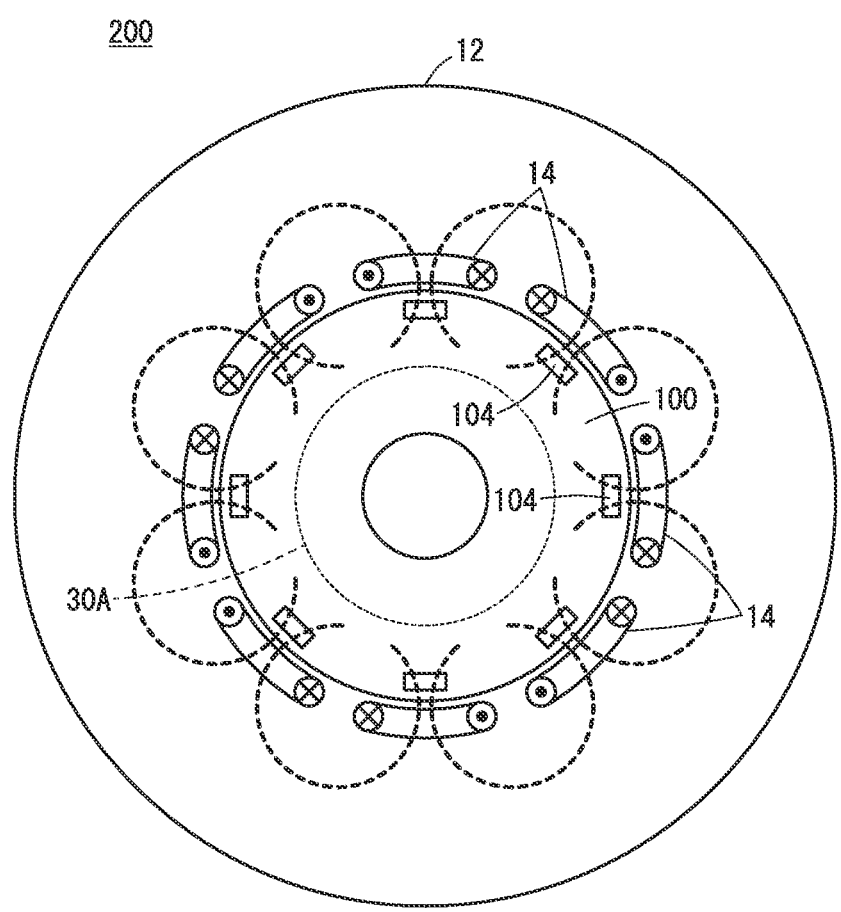
FIG. 3 COMPARATIVE EXAMPLE

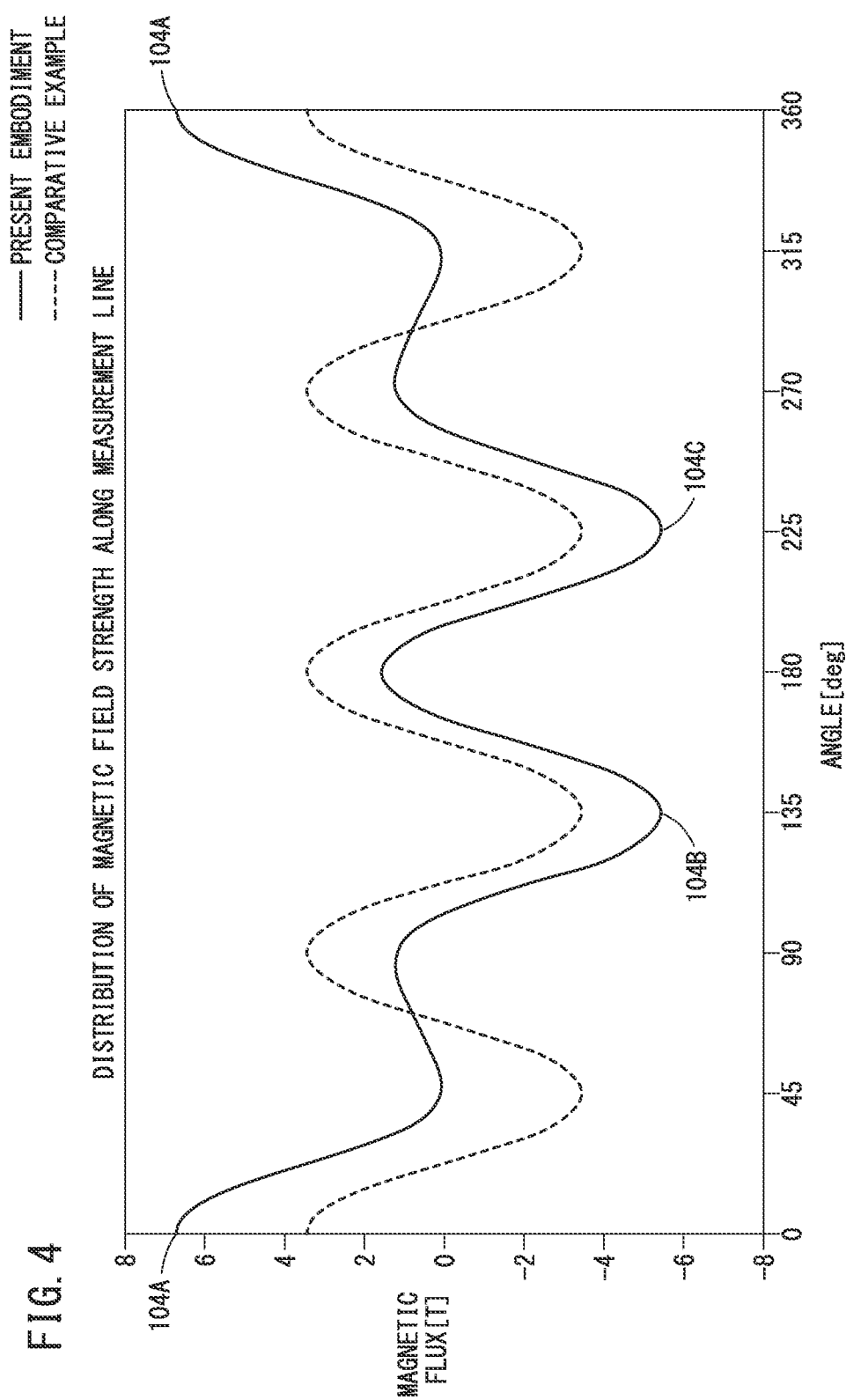

MAGNETIZING METHOD AND MAGNETIZING APPARATUS

CROSS-REFERENCE TO RELATED APPLICATIONS

This application is based upon and claims the benefit of priority from Japanese Patent Application No. 2022-051558 filed on Mar. 28, 2022, the contents of which are incorporated herein by reference.

BACKGROUND OF THE INVENTION

Field of the Invention

The present invention relates to a magnetizing method and a magnetizing apparatus for a rotor used in a motor.

Description of the Related Art

Electric vehicles, which do not emit greenhouse gases and have excellent environmental performance, are attracting attention. An electric vehicle is equipped with a high-output motor as a drive source. In addition, electrification of aircraft and work equipment is being promoted, and in the field of general-purpose equipment, replacement of engines with motors is being promoted.

Among the motors, the PM motor having permanent magnets in its rotor is said to be superior in efficiency and environmental performance. The rotor used for such a motor has a magnetization process for magnetizing a permanent magnet at the final stage of the manufacturing process. For example, JP 2005-224055 A discloses a magnetizing apparatus and a magnetizing method for a multipole permanent magnets arranged in a rotor.

SUMMARY OF THE INVENTION

In order to reduce the size and increase the output of the motor, research aiming at reducing the diameter and increasing the rotation speed of the motor is advancing. A high-rotation type motor may have a scattering prevention sleeve around the rotor in order to prevent deformation of the rotor due to centrifugal force and to prevent scattering of the magnet. In this case, an air gap between the stator and the rotor is widened, resulting in that the magnetization is affected. In addition, the rotor structure is changing because of: the appearance of the SPM type motor, in which magnets are arranged outside the rotor; the trial of higher output with the Halbach arrangement of magnets; the improvement of the performance of magnets; and the increase in the number of poles. A rotor having a smaller diameter and more poles leads to a smaller magnetic circuit for magnetizing permanent magnets and causes a problem that the magnetic flux hardly reaches the inside of the permanent magnets. Further, the improvement of the performance of the magnet increases the magnetic field strength required to magnetize magnets and requires a magnetizing magnetic field of higher strength. As described above, there has been appeared a rotor that is difficult to magnetize by means of a conventional magnetizing apparatus.

As a countermeasure against such a problem, it is conceivable to ensure the necessary magnetic field strength by increasing the power supply capacity and the electric current flowing through the magnetizing coil. However, the increase in current results in shortening the product lifetime of the magnetizing coil along with the increase in investment in power supply equipment, thereby increasing manufacturing costs.

An object of the present invention is to solve the above-described problems.

One aspect of the disclosure is a magnetizing method of applying, to a rotor including a plurality of magnetic bodies that are arranged in a circumferential direction of the rotor and are to be magnetized, a magnetic field in a radial direction of the rotor to magnetize the magnetic bodies, the magnetizing method including arranging a first magnetizing coil, a second magnetizing coil, and a third magnetizing coil near the outer peripheral portion of the rotor, and magnetizing the magnetic bodies by generating a radially outward magnetic field at the first magnetizing coil and generating a radially inward magnetic field at each of the second magnetizing coil and the third magnetizing coil.

Another aspect of the disclosure is a magnetizing apparatus for applying, to a rotor including a plurality of magnetic bodies arranged in a circumferential direction of the rotor, a magnetic field in a radial direction of a rotor and magnetizing the magnetic bodies, the magnetizing apparatus including a hollow portion in which the rotor is arranged, a first magnetizing coil that is arranged near the outer peripheral portion of the hollow portion and generates a radially outward magnetic field, a second magnetizing coil that is arranged near the outer peripheral portion of the hollow portion, is arranged at a position apart from the first magnetizing coil in the circumferential direction, and generates a radially inward magnetic field, and a third magnetizing coil that is arranged near the outer peripheral portion of the hollow portion, is arranged at a position apart from the first magnetizing coil and the second magnetizing coil in the circumferential direction, and generates a radially inward magnetic field.

With the magnetizing method and the magnetizing apparatus according to the above aspect, since the high-intensity magnetic field reaches the inside of the magnetic bodies (magnets) of the rotor, it is possible to reliably magnetize the magnetic bodies as far as the inside thereof while suppressing the manufacturing cost.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIGS. 2A, 2B and 2C are explanatory views showing a magnetizing method using the magnetizing apparatus of FIG. 1 in the order of magnetization steps.

FIG. 3 is a view showing a magnetic field distribution of a magnetizing apparatus according to a comparative example.

FIG. 4 is a graph showing distributions of magnetic field strength of the magnetizing methods according to the embodiment and the comparative example.

DETAILED DESCRIPTION OF THE INVENTION

First Embodiment

Figure 1A:
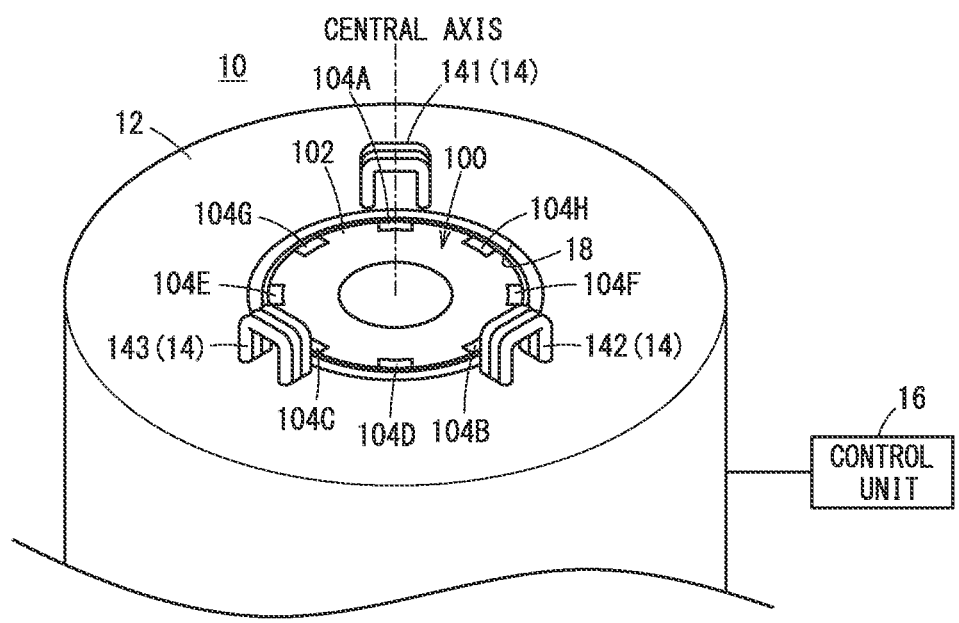
FIG. 1A is a perspective view of a magnetizing apparatus according to an embodiment.
Figure 1B:
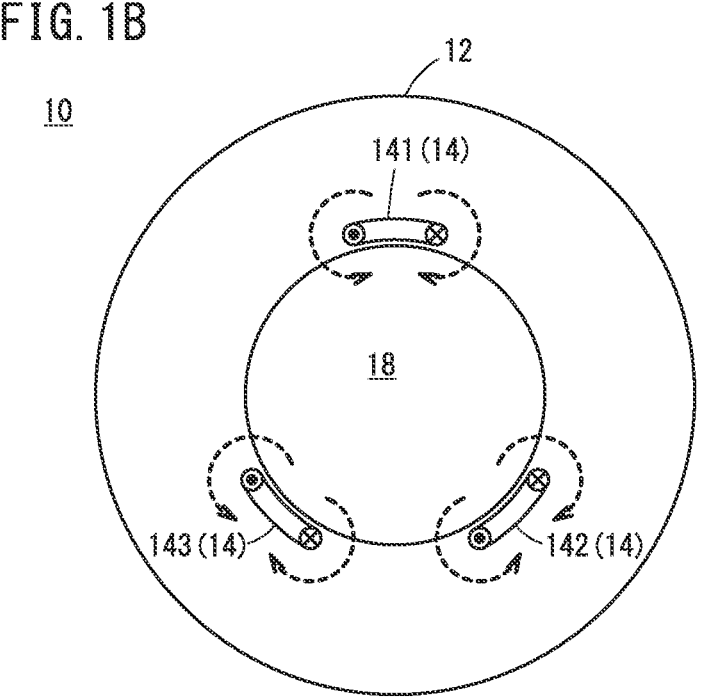
FIG. 1B is a plan view of the magnetizing apparatus according to the embodiment presented in a state in which a rotor has been removed.

As shown in FIGS. 1A and 1B, a magnetizing apparatus 10 according to the present embodiment includes a cylindrical magnetizing yoke 12, a magnetizing coil 14 embedded in the magnetizing yoke 12, and a control unit 16. The magnetizing yoke 12 has a cylindrical hollow portion 18 at a central portion thereof. The hollow portion 18 has an inner diameter slightly larger than the outer diameter of the rotor 100 that is to be processed. The magnetizing yoke 12 accommodates the rotor 100 in the hollow portion 18.

The rotor 100 is used for a PM motor, for example. The rotor 100 has a rotor main body 102 made of a soft magnetic material, and a plurality of magnetic bodies 104 that are embedded in the rotor main body 102 and are to be magnetized. Each magnetic body 104 is made of a hard magnetic material and becomes a permanent magnet by being magnetized through the magnetizing method of the present embodiment. In the present embodiment, for example, eight magnetic bodies 104 (104A to 104H) are arranged at equal intervals in the circumferential direction in the rotor main body 102. These magnetic bodies 104 are embedded in the rotor main body 102 and bonded with resin. The outer peripheral portions of the magnetic body 104 and the rotor main body 102 are covered with a reinforcing layer made of a carbon fiber composite material or the like. The rotor 100 may be the one used for an SPM motor. The number of magnetic bodies 104 (the number of poles) is not limited to eight.

The magnetizing coil 14 includes a first magnetizing coil 141, a second magnetizing coil 142, and a third magnetizing coil 143. That is, the number of magnetizing coils 14 is three. The number of magnetic bodies 104 (number of poles) of the rotor 100 to be processed may be different from the number of magnetizing coils 14. The magnetizing coil 14 is disposed near the hollow portion 18.

The first magnetizing coil 141, the second magnetizing coil 142, and the third magnetizing coil 143 are arranged at predetermined angles in the circumferential direction. In one example, if the position of the first magnetizing coil 141 is assumed to be at 0°, the second magnetizing coil 142 is disposed at 120°, and the third magnetizing coil 143 is disposed at 240°. In another example, if the position of the first magnetizing coil 141 is assumed to be at 0°, the second magnetizing coil 142 is disposed at 135°, and the third magnetizing coil 143 is disposed at 225°. In this way, the first magnetizing coil 141, the second magnetizing coil 142, and the third magnetizing coil 143 are arranged so as to have a Y-shaped positional relationship in plan view. Detailed values of the arrangement angles are appropriately adjusted according to the number of poles (and arrangement angle) of the magnetic bodies 104 to be magnetized.

The first magnetizing coil 141, the second magnetizing coil 142, and the third magnetizing coil 143 are arranged in such a manner that the central axes thereof face the radial direction of the rotor 100. Each of the magnetizing coils 14 is disposed at a position facing the magnetic body 104 and generates a magnetic field mainly in the radial direction with respect to the magnetic body 104. The magnetic bodies 104 are magnetized by the magnetizing coil 14 in the direction in which magnetic poles are generated in the radial direction.

The first magnetizing coil 141 generates a radially outward magnetic field. The second magnetizing coil 142 generates a radially inward magnetic field. The third magnetizing coil 143 generates a radially inward magnetic field. The number of turns and the supply current of each magnetizing coil 14 may be the same as those of the others.

The control unit 16 supplies the plurality of magnetizing coils 14 with current for generating magnetic fields. The control unit 16 applies magnetic fields for magnetization to the magnetic bodies 104 via the magnetizing coil 14 to magnetize the magnetic bodies 104. By repeatedly performing magnetization while rotating the rotor 100, the control unit 16 magnetizes a plurality of magnetic bodies 104 arranged in the circumferential direction so that N poles and S poles alternately appear on the outer peripheral side.

The magnetizing apparatus 10 of the present embodiment is configured as described above. The magnetizing method of the present embodiment is performed by using the magnetizing apparatus 10. The magnetizing method has the following steps.

First, as shown in FIG. 2A, a step of fixing the rotor 100 to the magnetizing apparatus 10 is performed. The illustrated rotor 100 includes eight magnetic bodies 104A to 104H though not particularly limited to this example. Rotor 100 is disposed in hollow portion 18. Thereafter, one magnetic body 104A is positioned to face the front surface of the first magnetizing coil 141, and the other two magnetic bodies 104B and 104C are positioned to face the front surface of the second magnetizing coil 142 and the front surface of the third magnetizing coil 143, respectively. The magnetic body 104B is separated from the magnetic body 104A by 135° in the circumferential direction, and the magnetic body 104C is separated from the magnetic body 104A by 225° in the circumferential direction. In this example, the second magnetizing coil 142 and the third magnetizing coil 143 are disposed at positions of 135° and 225° with respect to the first magnetizing coil 141, respectively. Thereafter, the rotor 100 is fixed to the magnetizing yoke 12 by a fixing member (not shown).

Next, the first round of the magnetization process of applying magnetic fields to the magnetic bodies 104 of the rotor 100 is performed. The magnetizing process is performed by the control unit 16 supplying current to the first magnetizing coil 141, the second magnetizing coil 142, and the third magnetizing coil 143. The control unit 16 supplies the first magnetizing coil 141 with current for generating a radially outward magnetic field. As a result, the magnetic body 104A is magnetized in the direction in which the radially outer side becomes the N pole and the radially inner side becomes the S pole.

Further, the control unit 16 supplies current for generating a radially inward magnetic field to the second magnetizing coil 142 and the third magnetizing coil 143. As a result, the magnetic bodies 104B and 104C are magnetized in the direction in which the radially outer side becomes the S pole and the radially inner side becomes the N pole.

As indicated by arrows in the drawing, a magnetic circuit having a Y-shape in plan view is formed inside the rotor 100 by the magnetic fields passing through the magnetic bodies 104B and 104C and the magnetic field passing through the magnetic body 104A. Therefore, even for the rotor 100 having a relatively small diameter, the magnetic field for magnetization reaches the center side of the magnetic bodies 104A, 104B, and 104C, and the magnetic bodies 104A, 104B, and 104C can be magnetized more effectively.

Further, a magnetic field obtained by combining the inward magnetic fields generated by the second magnetizing coil 142 and the third magnetizing coil 143 is drawn by the first magnetizing coil 141. As a result, magnetic flux lines are concentrated in the vicinity of the first magnetizing coil 141, whereby the magnetic field strength greatly increases in the vicinity of the first magnetizing coil 141. Further, the magnetic field strength in the vicinity of the second magnetizing coil 142 and the third magnetizing coil 143 also increases. Therefore, according to the magnetization process of the present embodiment, the magnetic susceptibility of the high-performance magnetic bodies 104A, 104B, and 104C can be increased, and a high-performance permanent magnet having a higher magnetic flux density can be formed.

Next, as shown in FIG. 2B, the magnetizing method proceeds to the second round of the magnetizing process. In the second-round magnetizing process, the rotor 100 is rotated so that the magnetic body 104E is disposed in front of the first magnetizing coil 141. Further, a magnetic body 104H separated by 135° in the circumferential direction from the magnetic body 104E and a magnetic body 104B separated by 225° in the circumferential direction from the magnetic body 104E are placed in front of the second magnetizing coil 142 and in front of the third magnetizing coil 143, respectively. Thereafter, current is supplied to the first magnetizing coil 141, the second magnetizing coil 142, and the third magnetizing coil 143 to magnetize the magnetic bodies 104B, 104E, and 104H.

Further, the magnetizing method proceeds to the third round of the magnetization process shown in FIG. 2C in the same manner as the first and second magnetization processes described above. Further, although not shown, the process proceeds to the fourth round of the magnetizing process of the magnetizing method. In the third-round magnetizing process, the magnetic body 104D is magnetized so that the N pole appears on the outer peripheral side, and in the fourth-round magnetizing step, the magnetic body 104F is magnetized so that the N pole appears on the outer peripheral side.

Through the above process, the magnetization of all the magnetic bodies 104A to 104H of the rotor 100 is completed, and the magnetization process of the present embodiment ends.

In the magnetizing process of the comparative example shown in FIG. 3, a magnetizing apparatus 200 having eight magnetizing coils 14 is used. In the case of the magnetizing apparatus 200, a magnetizing coil 14 is arranged on the outer peripheral portion of each of eight magnetic bodies 104. In the case of the magnetizing apparatus 200, current is supplied to eight magnetizing coils 14 simultaneously. In the magnetization process of the comparative example, the eight magnetic bodies 104 are simultaneously magnetized. In the magnetization process of the comparative example, the magnetic circuit becomes small as shown in the drawing, and a sufficient magnetic field cannot be applied to the inner side of the magnetic body 104.

On the other hand, as shown in FIGS. 2A to 2C, in the magnetizing process of the present embodiment, current is supplied only to part of the magnetizing coils 14 separated in the circumferential direction. As shown in the drawing, since the magnetization process of the present embodiment can form a large magnetic circuit, it is possible to effectively magnetize the magnetic bodies 104A, 104B, and 104C up to the inner portions thereof. In addition, since the magnetic flux passing through the magnetic bodies 104B and 104C can be concentrated near the magnetic body 104A, a high magnetic field for magnetization can be applied to the magnetic body 104A.

FIG. 4 shows a distribution of magnetic field strength (magnetic flux density) obtained by simulation calculation. A distribution of the magnetic field strength by the magnetizing apparatus 10 according to the embodiment is the distribution of the magnetic field strength along a measurement line 30 in FIG. 2A. A distribution of the magnetic field strength of the magnetizing apparatus 200 according to the comparative example is the distribution of the magnetic field strength along a measurement line 30A in FIG. 3. The magnetic field strength of the magnetizing method of the present embodiment is shown by a solid line whereas the magnetic field strength of the magnetizing method of the comparative example is shown by a broken line. As shown in the drawing, it is understood that for any of the magnetic bodies 104A, 104B, and 104C to be magnetized, the magnetizing method of the present embodiment provides a higher magnetic field for magnetization than the magnetizing method of the comparative example does. Further, it is understood that the magnetic field strength at the magnetic body 104A where the magnetic field is concentrated is about twice as strong as the magnetic field strength of the magnetizing method of the comparative example, and the magnetic body 104A can be magnetized more effectively.

The embodiments described above are summarized below.

A magnetizing method of applying, to a rotor 100 including a plurality of magnetic bodies 104 that are arranged in a circumferential direction of the rotor and are to be magnetized, a magnetic field in a radial direction of the rotor and magnetizing the magnetic bodies, the magnetizing method including arranging a first magnetizing coil (141), a second magnetizing coil (142), and a third magnetizing coil (143) near the outer peripheral portion of the rotor, and magnetizing the magnetic bodies by generating a radially outward magnetic field at the first magnetizing coil and generating a radially inward magnetic field at each of the second magnetizing coil and the third magnetizing coil.

According to the above-described magnetizing method, since the high-intensity magnetic field reaches the inside of the magnetic bodies (magnets) of the rotor, it is possible to reliably magnetize the magnetic bodies as far as the inside thereof.

In the magnetizing method described above, in the magnetizing, a combined magnetic field obtained by combining the magnetic field generated by the second magnetizing coil and the magnetic field generated by the third magnetizing coil is drawn by the magnetic field generated by the first magnetizing coil, whereby a region with the highest magnetic flux density is formed near the first magnetizing coil. This magnetizing method can increase the magnetic field strength in the vicinity of the first magnetizing coil.

In the magnetizing, a Y-shaped magnetic circuit directed toward the first magnetizing coil in a plan view is generated. This magnetizing method can increase the magnetic field strength in the vicinity of the first magnetizing coil.

In the magnetizing method described above, when a position of the first magnetizing coil in the circumferential direction is 0°, the second magnetizing coil may be arranged at a position of 135° and the third magnetizing coil may be arranged at a position of 225°. This magnetizing method exhibits a high magnetizing effect for a rotor having eight magnetic bodies.

In the above magnetizing method, the first magnetizing coil, the second magnetizing coil, and the third magnetizing coil may be arranged at equal intervals in the circumferential direction. This magnetizing method exhibits a high magnetizing effect for a rotor in which magnetic bodies are arranged at angular intervals of 15° or 30°.

In the above-described magnetizing method, the magnetizing may be performed a plurality of times changing an orientation of the rotor. This magnetizing method can reliably magnetize magnetic bodies even when the number of magnetic bodies in the rotor is different from the number of magnetizing coils.

A magnetizing apparatus 10 for applying, to a rotor including a plurality of magnetic bodies arranged in a circumferential direction of the rotor, a magnetic field in a radial direction of the rotor to magnetize the magnetic bodies, the magnetizing apparatus including a hollow portion 18 in which the rotor is arranged, a first magnetizing coil that is arranged near the outer peripheral portion of the hollow portion and generates a radially outward magnetic field, a second magnetizing coil that is arranged near the outer peripheral portion of the hollow portion, is arranged at a position apart from the first magnetizing coil in the circumferential direction, and generates a radially inward magnetic field, and a third magnetizing coil that is arranged near the outer peripheral portion of the hollow portion, is arranged at a position apart from the first magnetizing coil and the second magnetizing coil in the circumferential direction, and generates a radially inward magnetic field.

The above-described magnetizing apparatus can reliably apply a high magnetic field to the inside of the magnetic body of the rotor without requiring a high-current power supply device.

It should be noted that the present invention is not limited to the above-described embodiment, and various configurations can be adopted without departing from the gist of the present invention.

What is claimed is:

1. A magnetizing method of applying, to a rotor including a plurality of magnetic bodies that are arranged in a circumferential direction of the rotor and are to be magnetized, a magnetic field in a radial direction of the rotor and magnetizing the magnetic bodies, the magnetizing method comprising:
    arranging a first magnetizing coil, a second magnetizing coil, and a third magnetizing coil near an outer peripheral portion of the rotor; and
    magnetizing the magnetic bodies by generating a magnetic field in a first direction of the radial direction at the first magnetizing coil and generating a magnetic field in a second direction of the radial direction opposite to the first direction at each of the second magnetizing coil and the third magnetizing coil,
    wherein in the circumferential direction, an interval between the second magnetizing coil and the third magnetizing coil is smaller than an interval between the first magnetizing coil and the second magnetizing coil and is smaller than an interval between the first magnetizing coil and the third magnetizing coil, and
    wherein an absolute value indicating magnetic field strength in a vicinity of the first magnetizing coil is greater than an absolute value indicating magnetic field strength in a vicinity of the second magnetizing coil, and the absolute value indicating magnetic field strength in the vicinity of the first magnetizing coil is greater than an absolute value indicating magnetic field strength in a vicinity of the third magnetizing coil.

2. The magnetizing method according to claim 1, wherein in the magnetizing, a combined magnetic field obtained by combining the magnetic field generated by the second magnetizing coil and the magnetic field generated by the third magnetizing coil is drawn by the magnetic field generated by the first magnetizing coil, whereby a region with a highest magnetic flux density is formed near the first magnetizing coil.

3. The magnetizing method according to claim 2, wherein in the magnetizing, a Y-shaped magnetic circuit directed toward the first magnetizing coil in plan view is generated.

4. The magnetizing method according to claim 1, wherein when a position of the first magnetizing coil in the circumferential direction is 0°, the second magnetizing coil is arranged at a position of 135° and the third magnetizing coil is arranged at a position of 225°.

5. The magnetizing method according to claim 1, wherein the magnetizing is performed a plurality of times changing an orientation of the rotor.

6. A magnetizing apparatus for applying, to a rotor including a plurality of magnetic bodies arranged in a circumferential direction of the rotor, a magnetic field in a radial direction of the rotor and magnetizing the magnetic bodies, the magnetizing apparatus comprising:
    a hollow portion in which the rotor is arranged;
    a first magnetizing coil that is arranged near an outer peripheral portion of the hollow portion and generates a magnetic field in a first direction of the radial direction;
    a second magnetizing coil that is arranged near the outer peripheral portion of the hollow portion, is arranged at a position apart from the first magnetizing coil in the circumferential direction, and generates a magnetic field in a second direction of the radial direction opposite to the first direction; and
    a third magnetizing coil that is arranged near the outer peripheral portion of the hollow portion, is arranged at a position apart from the first magnetizing coil and the second magnetizing coil in the circumferential direction, and generates a magnetic field in the second direction of the radial direction,
    wherein in the circumferential direction, an interval between the second magnetizing coil and the third magnetizing coil is smaller than an interval between the first magnetizing coil and the second magnetizing coil and is smaller than an interval between the first magnetizing coil and the third magnetizing coil, and
    wherein an absolute value indicating magnetic field strength in a vicinity of the first magnetizing coil is greater than an absolute value indicating magnetic field strength in a vicinity of the second magnetizing coil, and the absolute value indicating magnetic field strength in the vicinity of the first magnetizing coil is greater than an absolute value indicating magnetic field strength in a vicinity of the third magnetizing coil.

* * * * *